W. W. GRAHAM.
STOVEPIPE.
APPLICATION FILED MAR. 21, 1908.

940,927. Patented Nov. 23, 1909.

Witnesses
Sylvia Boro
H. O. Rastetter

Inventor
William W. Graham
By Bond + Miller
Attorney

UNITED STATES PATENT OFFICE.

WILLIAM W. GRAHAM, OF NEW PHILADELPHIA, OHIO.

STOVEPIPE.

940,927.  Specification of Letters Patent.  Patented Nov. 23, 1909.

Application filed March 21, 1908. Serial No. 422,513.

*To all whom it may concern:*

Be it known that I, WILLIAM W. GRAHAM, a citizen of the United States, residing at New Philadelphia, in the county of Tuscarawas and State of Ohio, have invented certain new and useful Improvements in Stovepipes; and I do hereby declare that the following is a full, clear, and exact description of the same, reference being had to the accompanying drawing, making a part of this specification, and to the figures of reference marked thereon, in which—

Figure 1:
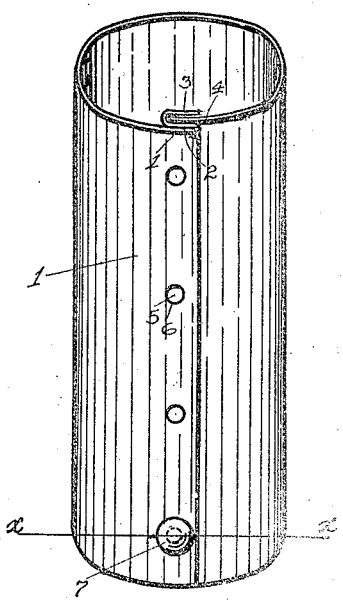
Figure 2:
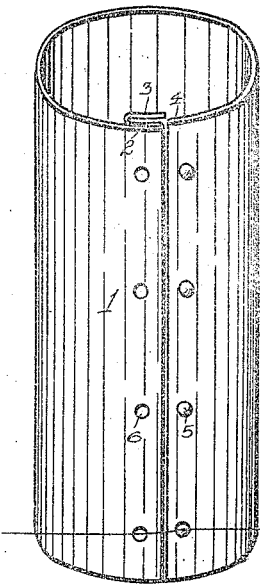
Figure 3:
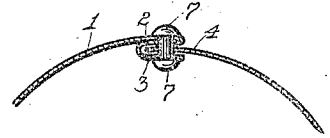
Figure 4:
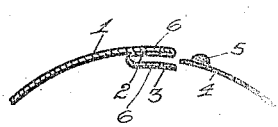

Figure 1 is a view of a stove pipe section showing the joint closed. Fig. 2 is a similar view showing the joint open. Fig. 3 is a section taken on line X—X, Fig. 1. Fig. 4 is a view taken on line Y—Y, Fig. 2.

The present invention has relation to stove-pipes and has more specific reference to the joints connecting the longitudinal edges of the cylindrical body of the pipe section.

Similar numerals of reference indicate corresponding parts in all the figures of the drawings.

In the accompanying drawing, 1 represents a section of pipe, which may be formed of any desired size and length, reference being had to the desired size of the finished pipe. It will also be understood that any number of sections may be connected together to produce a stove pipe of the desired length. One of the longitudinal edges of each section is folded back and upon the inner surface of the same for a short distance and a second fold then given, thereby producing the spaced portions 2 and 3, which spaced portions constitute a groove adapted to receive the opposite raw or unfolded edge of the section.

At short distances back of the raw edge 4 are located any desired number of nibs 5, which are pressed outward or extend in an outward direction after the section has been brought into cylindrical form. By so pressing out the nibs, it will be understood that the metal at the sides of said nibs will necessarily be drawn or weakened so that the said nibs may be readily punched through to form apertures. The folded member 2, the body of the pipe section 1 and the portion 3 are each provided with apertures 6, which apertures are so formed that they will register one with the other. The apertures 6 in the portions 1 and 2 are for the purpose of receiving the nibs 5 when the unfolded edge of the pipe section is arranged within the groove constituted by the portions 2 and 3. When so arranged the said nibs assist in holding the said unfolded edge within said groove and will constitute a sufficient fastening for said edges except at the end of the pipe which may be termed the outer overlapping end when two pipe sections are connected together. The edges at the outer, over-lapping end, into which the end of an adjacent pipe section is inserted should be more securely fastened, and for this purpose the rivet 7 is employed. In this connection a second important purpose of the apertures 6 will be clearly understood. It is frequently desirable to cut portions from the standard lengths of pipe sections in order to provide a pipe of suitable length to properly connect the stove or furnace with the chimney and as above noted it is important that a seam fastening rivet be located at the end of the section into which an adjacent section is to be inserted. In using pipe sections constructed in accordance with the present invention, the unheaded end of the rivet may be inserted through the aperture in the member 3 into engagement with the inner, concave, drawn or weakened walls of the nib 5, which nib registers with the aperture 6 in the portions 1 and 2, thus providing for the ready and convenient punching through of the said nib by placing a block of wood or other suitable material exteriorly upon the portion 1 over the said aperture 6, while the rivet is located in the aperture 6 of the portion 3 and in the nib 5, and striking a blow upon said block, the head of the rivet resting upon a suitable support extending into the interior of the section at the end where the rivet is located. In this manner the unheaded end of the rivet will readily punch the top portion of the nib 5 through the aperture 6 in the portions 1 and 2, the operation being facilitated by reason of the weakened condition of the walls of the nib 5 and the reinforced walls of the aperture 6 in the portions 1 and 2 by reason of the fact that said portions are folded upon each other, thus constituting a portion of double thickness and strength well adapted to act in conjunction with the rivet to punch through the nib. After the rivet has punched through the nib and extends through the aperture 6 in the portions 1 and 2, it may be headed down, thus firmly fastening the unflanged edge within the groove at that point.

Pipe sections constructed in accordance with this invention can be nested at the factory and shipped in a nested condition thereby reducing the bulk, after which a rivet can be placed in the end of each section after the nib has been punched through the aperture.

Having fully described my invention what I claim as new and desire to secure by Letters Patent, is—

A stove pipe section provided with longitudinal seam edges, one of said edges folded back upon the inner surface of the section for a short distance and a second fold given to said edge, the said folded portions constituting the sides of a groove adapted to receive the opposite unfolded edge of the section, said folded portion provided with apertures, and said unfolded edge provided with outwardly pressed and drawn nibs adapted to register with the apertures and one end of the section provided with a rivet, said rivet entered through the registering aperture in the folded portion of the section, substantially as and for the purpose specified.

In testimony that I claim the above, I have hereunto subscribed my name in the presence of two witnesses.

WILLIAM W. GRAHAM.

Witnesses:
P. S. OLMSTEAD,
W. S. ENGLISH.